United States Patent [19]

Erickson et al.

[11] 4,161,448

[45] Jul. 17, 1979

[54] COMBINED SEPARATOR AND PUMP WITH DIRTY PHASE CONCENTRATOR

[75] Inventors: John W. Erickson, Huntington Beach; Peter A. Soriano, Rowland Heights, both of Calif.

[73] Assignee: Kobe, Inc., Huntington Park, Calif.

[21] Appl. No.: 879,811

[22] Filed: Feb. 21, 1978

[51] Int. Cl.[2] .............................................. B01D 43/00

[52] U.S. Cl. ..................................... 210/258; 210/259; 210/294; 210/512 M; 417/84

[58] Field of Search .................. 210/258, 259, 512 M, 210/512 R, 260, 261, 294; 233/22, 46; 415/89; 417/84

[56] References Cited

U.S. PATENT DOCUMENTS

| | | | |
|---|---|---|---|
| 3,679,051 | 7/1972 | Larson et al. | 210/512 R |
| 3,764,008 | 10/1973 | Darley et al. | 210/512 M |
| 3,817,659 | 6/1974 | Erickson et al. | 417/84 |

FOREIGN PATENT DOCUMENTS

| | | | |
|---|---|---|---|
| 317737 | 1/1972 | U.S.S.R. | 210/512 M |

*Primary Examiner*—John Adee

*Attorney, Agent, or Firm*—Christie, Parker & Hale

[57] ABSTRACT

A pitot pump separates a two-phase fluid from a source into a clean, lighter phase and a dirty, heavier phase by subjecting them to a centrifugal force field in a rotating chamber. A small radius pitot tap of the pump draws some of the lightest phase from the chamber to provide the power fluid that drives a jet pump. The jet pump aspirates dirty fluid of the heavier phase that has accumulated in the casing of the pitot pump. Cyclones separate solids of the heavier phase from liquid in the discharge of the jet pump. Concentrated solids from the cyclones in a liquid carrier discharge into mud pots. A cleansed liquid stream leaving the cyclones recycles back into the inlet of the pitot pump, or, is taken off as a clean low pressure stream.

15 Claims, 1 Drawing Figure

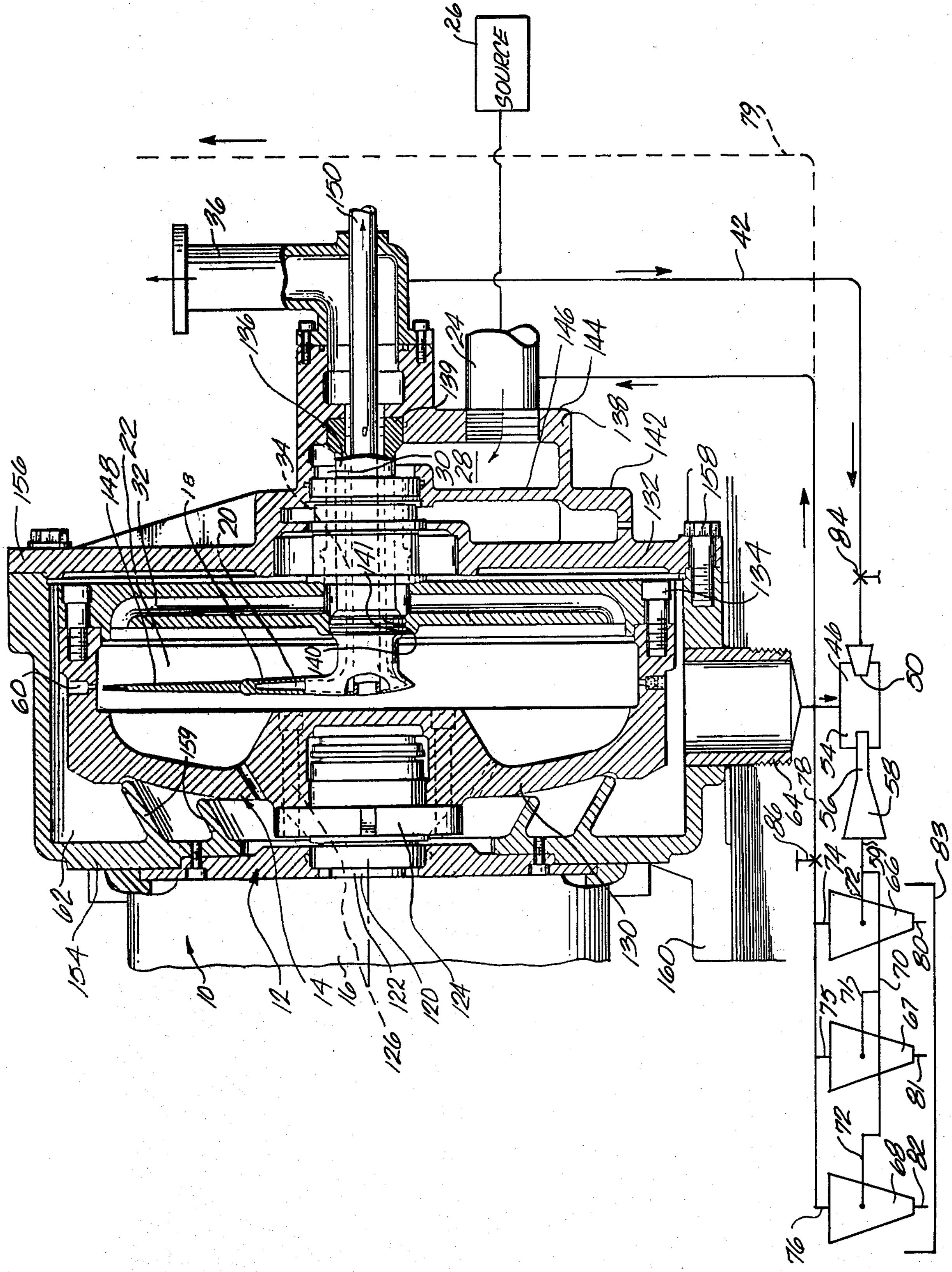
SOURCE

COMBINED SEPARATOR AND PUMP WITH DIRTY PHASE CONCENTRATOR

BACKGROUND OF THE INVENTION

The present invention relates to the art of fluid phase separation, and, more in particular, to a centrifugal, pitot separator that separates solids and liquids and produces a fluid with acceptably low solids content to be used elsewhere and to be used for concentrating the solids so that solids and a liquid carrier discharge at an acceptably low flow rate.

It is not uncommon for a fluid to be contaminated with solid materials and for this reason to be unusable. Solids can cause abrasion damage to seals, bearings, blades and the like of machinery with which the fluid is used, either as a power fluid or as a fluid undergoing an increase in head.

There are many ways of separating solids from a fluid. One way is by centrifugal cleaners. Pitot cleaners are a type of centrifugal cleaner. A pitot cleaner has a hollow rotor driven by a motor. The rotor rotates within a casing or housing. A stationary pitot tube at a predetermined radial zone within the rotor intercepts fluid and draws the fluid out of the rotor. This cleansed fluid may then become a process fluid for some activity, say, a power fluid for hydraulic machinery. Solids that are heavier than the rest of the phases of the fluid go into the casing or housing surrounding the rotor as "underflow" through nozzles in the outside of the rotor and at the maximum radius of the rotor. The solids are entrained in liquid. There the material is discharged, but the discharge can be a nuisance.

It is also known that jet pumps that employ a pressurized fluid to aspirate another fluid are good at handling abrasive streams. A jet pump and pitot pump combination is shown in U.S. Pat. No. 3,817,659.

It is also known that cyclone separators effectively remove solids from a stream by reducing the kinetic energy of the stream and the solids, resulting in the solids coming out of suspension.

Especially in particularly dirty streams a problem of disposal of the underflow from a separator presents itself. The dirty effluent includes a carrier liquid and the quantity of the effluent creates the problem. In some locations it becomes difficult to conveniently store and dispose of the waste effluent.

It would be desirable to provide a means for concentrating the solids in order to reduce the quantity of waste resulting from separation. At the same time, it would be desirable to provide a cleansed stream with at least some of the head it had before cleaning.

SUMMARY OF THE INVENTION

The present invention provides a means for concentrating solid waste from a fluid to produce a cleansed output fluid having an acceptably low solids content.

In general, the invention contemplates the use of a centrifugal separator that separates solids from an input fluid by the action of a centrifugal force field. The waste effluent from this process is further concentrated in downstream separators to produce a cleansed stream. The cleansed stream, preferably is reintroduced into the centrifugal separator with the input fluid stream. Alternatively, the cleansed stream is a product stream. A second cleansed product fluid stream emanates from the first stage of separation.

In preferred form, the present invention contemplates a centrifugal separator that produces a solid waste effluent. A stream is taken from the separator after its head has been increased and used as the carrier stream in a a jet pump. This jet pump aspirates the solid waste from the centrifugal separator. The discharge from the jet pump passes into one or more additional separators to concentrate the solid waste. The clean discharge from these additional separators is then reintroduced into the first stage, centrifugal separator, or leaves as a cleansed stream. A cleansed stream takes off from the first stage of separation.

Preferably, the first of the centrifugal separators is of the pitot type and has at least one pitot tap located in a zone where pressure is moderate. The tap draws energized working fluid from the rotor. A branch of this stream becomes the aspirating fluid in the jet pump. Solid waste in a liquid carrier discharges from the rotor through nozzles into the casing of the separator. An agitator can keep the nozzle from clogging. The solid material aspirates into the jet pump and the discharge from the jet pump feeds into one or more cyclone separators. These latter separators concentrate the solid waste and the concentrate discharges into mud pots or the like. The cleansed fluid stream from the cyclones passes back into the inlet of the centrifugal, pitot separator.

The present invention provides a convenient and simple means for concentrating solid waste effluent to reduce the volume of storage necessary for such effluent.

These and other features, aspects and advantages of the present invention will become more apparent from the following description, appended claims and drawings.

BRIEF DESCRIPTION OF THE FIGURE

The single FIGURE is a view partly in half section and partly broken away of a pitot separator and jet pump together with schematic depictions of the balance of a solid waste concentrator circuit.

DESCRIPTION OF THE PREFERRED EMBODIMENT

With reference to the FIGURE, a centrifugal separator 10 has a casing 12 and a rotor 14. A drive, such as a motor 16, rotates the rotor within the casing. A pitot tap 18 within the casing has a radial passage 20 that opens into a cavity 22 that is within the rotor. The opening into the tap faces rotating fluid at a predetermined radial zone and draws fluid from within the rotor. A feed line 24 feeds dirty fluid from a source 26 into a chamber 28. From there, the fluid enters an annulus 30 that is concentric with the rotational axis of the rotor. Fluid leaving annulus 30 moves radially outward of the axis of rotation of the rotor in a plurality of radial passages 32. These passages empty into chamber 22 of the rotor slightly inward of the extreme radial periphery of the chamber.

Radial passage 20 of pitot tap 18 opens into an annular passage 34 that is concentric with the axis of rotation of the rotor. This passage leads to a discharge line 36.

Pitot tap 18 opens into chamber 22 at a radial zone determined by the pressure requirements of downstream concentrators. Pitot cleaners have the capability of increasing the static head of fluid substantially when the tap opens at a large radius. In the case of cyclone separators this can be too much pressure and represents a loss of valuable energy because the pressure would have to be dissipated.

A line 42 takes off from discharge line 36 and empties into a fore-chamber of a jet pump 46. The fore-chamber leads to a nozzle 50 through a converging passage. An aspirating chamber 54 of the jet pump sees the pressure of a fluid stream emanating from nozzle 50. Fluid in aspirating chamber 54 is aspirated into a passage 56. Passage 56 opens into a diffuser 58 to reduce the velocity of the stream and increase the static pressure of the stream. The diffuser opens into a line 59.

Rotor 14 has a plurality of radial nozzles 60 between rotor chamber 22 and an external chamber 62 between rotor 14 and casing 12. Solids and fluid pass through these nozzles into chamber 62. A line 64 from the chamber to aspirating chamber 54 provides as the aspirated fluid of pump 46 the solids and fluid from chamber 62. The fluid and solid material in chamber 62 is sometimes referred to as underflow.

To summarize the description to this point, fluid from a source enters centrifugal separator 10 and passes into rotor chamber 22. Rotor 14, driven in rotation, stratifies the phases of the fluid in accordance with their density. The stratification will find a fluid and solids at the extreme radial periphery of the rotor chamber, a lighter phase fluid inside this zone, and any gas radially inside of this intermediate zone. Solids and fluid leave the rotor through nozzles 60 and enter chamber 62. Jet pump 46, using as an aspirating fluid the fluid drawn by pitot tap 38, aspirates these solids and water through line 64 and into line 59. The aspirating fluid is energized by the rotor and leaves chamber 22 through pitot tap 38. The stream in line 59, rich in solids, then proceeds for concentration of the solids and solids disposal.

Concentration of the solids in stream 59 takes place in a bank of cyclone separators 66, 67 and 68. Line 59 branches into lines 70 and 72. Line 72 feeds cyclone 66. Line 70 supplies cyclones 67 and 68. Line 70 branches into lines 71 and 72 which directly feed cyclones 67 and 68, respectively. As is known, the cyclones receive a stream tangentially at a large diameter section of an inverted cone. The stream suffers a drop in velocity in the cyclone. Solid materials drop out of suspension because of the loss of velocity of the stream and solid materials. Concentrated solid materials in liquid fall by gravity to the bottom of the cyclones, and liquid, freed of much of the solids it formerly carried, leaves the cyclones. The liquid leaving cyclones 66, 67 and 68 does so through lines 74, 75 and 76, respectively. These lines join in a line 78. Line 78 in turn tees into feed line 24 that goes back into the centrifugal separator. Alternatively, line 78 can go off as a low pressure, clean fluid line 79, as shown in dashed lines. Solid effluent from cyclones 66, 67 and 68 leaves the cyclones as streams 80, 81 and 82, respectively, for accumulation in a mud pot 83.

The flow rate to jet pump 46 is determined by a flow control valve 84 upstream from the pump and in line 42. Since valve 84 controls the flow rate of the aspirating stream of the jet pump, it also controls the flow rate of the aspirated stream in line 64.

Back pressure control for the cyclones is by a valve 86 in line 78. This valve permits the establishment of the correct pressure differential across the cyclones for their proper functioning.

Thus, pitot separator 10 receives a stream of contaminated fluid and separates the fluid into phases. A denser phase, typically solids in a liquid although it need not be, leaves chamber 22 through nozzles 60 and enters external chamber 62. A clean phase leaves chamber 22 through pitot tap 18 and line 36. This clean phase is at comparably high pressure and thus the separation process has saved some of the energy required by it. The phase in external chamber 62, which includes waste material, is concentrated in the bank of cyclones 66, 67 and 68. The concentrated waste accumulates in mud pot 83. Without concentration, the volume of waste could be several times the volume of waste with concentration. Stream 78 usually is sufficiently clean so as not to require further cleansing. When this is the case, the stream leaves as stream 79. When further cleansing is required, stream 78 reenters pitot separator 10 for treatment.

The jet pump that feeds the cyclones feeds them with fluid under sufficient pressure to drive the cyclones. This pressure results from the pitot tap picking up an aspirating fluid with a head augmented by the pumping action of the rotor.

Separator 10 further includes a drive shaft 120. The drive shaft is driven by motor 16. A seal and bearing 122 around shaft 120 prevents leakage out of chamber 62 along the shaft. A flange 124 of shaft 120 attaches to rotor 14 as by threaded fasteners 126.

Rotor 14 has a deeply dished casing member 130 and a cover 132 secured to casing member 130 as by threaded fasteners 134. Casing 130 and cover 132 bound chamber 22. Passage 34 lies within a stationary tube 136. Tube 136 extends out into a hub 138 of housing 12 at the anterior end of the separator. A hub 139 of tube 136 is received in and supported by hub 138. Ring seals 140 on tube 136 isolate chamber 22 from the outside of tube 136 externally of the chamber. The seals cooperate with a bore 141 of cover 132 in the sealing function. Passage 34 empties into line 36 downstream of hub 139.

Cover 132 has a hub 142. A second hub 144 extends from hub 142 away from rotor 14. A web 146 at the junction of the two hubs extends radially inward and defines an inner wall of chamber 28. Annulus 30 passes through hubs 142 and 144 to meet radial passages 32.

A stirrer vane 148 attached to tube 136 and extending radially from the axis of rotation of rotor 14 in chamber 22 approaches the radius of the inlet of nozzle 60. The stirrer vane agitates the fluid and solids at the entrance to the nozzles and prevents clogging.

A tube 150 on the axis of rotation of rotor 14 opens into chamber 22 along the axis to collect any light phase material, such as gas, and the material passes through the tube to some place outside the separator.

Casing 12 includes a primary drum 154 and a cover 156. The cover secures to the drum by threaded fasteners 158. Cover 156 is integral with hub 138. Baffles 159 in the wall of drum 154 direct fluid and solids away from seal 122. The separator can mount on a stand 160.

Except where modified here, U.S. Pat. No. 4,036,427 describes a suitable pitot separator. The disclosure of this patent is incorporated herein by reference. U.S. Pat. No. 3,817,659 shows the use of a pitot separator and jet pump. The disclosure of the latter patent is incorporated herein by reference.

By way of example to illustrate the efficacy of the present invention, assume a flow rate of 80 gallons per minute of feed into the centrifugal separator. Assume an underflow rate out line 64 of about 4 gallons per minute. Aspirating stream 42 for jet pump 46 has a flow rate of also 4 gallons per minute. Each of the three cyclones 66, 67 and 68 then receives $2\frac{2}{3}$ gallons per minute. The waste effluent from the cyclones passing into mud pot 83 will have a flow rate of about one gallon per minute. Thus in practical effect the underflow has been reduced from 4 gallons per minute to one gallon per minute.

The present invention has been described with reference to a preferred embodiment. The spirit and scope of the appended claims should not, however, necessarily be limited to the foregoing embodiment.

We claim:

1. An improvement in the means for separating waste from a dirty fluid to generate a cleansed fluid stream, the improvement comprising:

(a) centrifugal separator means for separating waste from a dirty fluid stream by centrifugal force and creating separated waste in a fluid carrier and a first cleansed fluid stream;

(b) at least one secondary separator;

(c) means communicating the separated waste and fluid carrier from the centrifugal separator to the secondary separator for the concentration of the waste and the formation by the secondary separator of a second cleansed fluid stream from the fluid carrier and a waste stream;

(d) means using at least a portion of the first cleansed fluid and at least a portion of the head imparted to such first cleansed fluid by the centrifugal separator means to pump the separated solid waste and fluid carrier to the secondary separator through the communicating means; and (e) means for receiving the waste stream.

2. The improvement claimed in claim 1 wherein the centrifugal separator means separates solids and the fluid carrier from the dirty fluid stream, and the separated waste is the solids.

3. The improvement claimed in claim 2 including means for combining the second cleansed fluid stream with the dirty fluid stream at the inlet to the centrifugal separator.

4. The improvement claimed in claim 2 wherein the centrifugal separator is a pitot tube separator, the pitot tube separator having a rotor, means to rotate the rotor, and a pitot tube tap at a predetermined radial zone in the rotor to intercept and draw off the first cleansed fluid stream.

5. The improvement claimed in claim 3 wherein the means employing the first cleansed fluid to pump the separated solid waste and fluid carrier includes a jet pump, the first cleansed fluid providing the aspirating stream of the jet pump and the solids and the fluid carrier providing the aspirated stream.

6. The improvement claimed in claim 5 wherein the secondary separator is a cyclone separator.

7. An improvement in the means for separating solids from a dirty fluid stream comprising:

(a) a centrifugal separator;

(b) means for supplying the inlet of the centrifugal separator with the dirty fluid stream;

(c) means in the centrifugal separator for forming a solid waste effluent stream having a high concentration of solids relative to the dirty fluid stream;

(d) means in the centrifugal separator for forming a cleansed fluid stream having a low concentration of solids compared with the dirty fluid stream;

(e) jet pump means;

(f) means to provide as an aspirating fluid for the jet pump means at least a portion of the cleansed fluid stream and to use at least a portion of the head imparted to such cleansed fluid for aspiration of the solid waste effluent stream;

(g) means to communicate the solid waste effluent stream from the centrifugal separator with the jet pump for aspiration into the pump by the aspirating cleansed fluid stream and the head imparted to such fluid by the centrifugal separator, the aspirated solid waste effluent stream and aspirating cleansed fluid stream forming a discharge stream from the jet pump;

(h) secondary separator means for highly concentrating the solid waste in the discharge stream from the jet pump and to form a cleansed stream and a highly concentrated solid stream; and (i) means for introducing the cleansed stream from the secondary separator means into the inlet of the centrifugal separator.

8. The improvement claimed in claim 7 wherein the centrifugal separator is a pitot tube separator, the pitot tube separator having a rotor, means to rotate the rotor, and a pitot tube tap at a predetermined radial zone in the rotor to intercept and draw off the cleansed fluid stream.

9. The improvement claimed in claim 7 wherein the secondary separator means includes cyclone separator means.

10. The improvement claimed in claim 8 wherein the secondary separator means includes cyclone separator means.

11. An improvement in the means for separating solids from a dirty fluid stream to form a cleansed fluid stream comprising:

(a) a centrifugal separator of the pitot type having at least one pitot tap in a rotor positioned in a radial zone to draw off cleansed fluid from within the rotor, and means for discharging solid waste in a carrier liquid from the rotor;

(b) jet pump means;

(c) means for generating an aspirating stream for the jet pump including the pitot tap in the rotor so that the aspirating stream is energized by the rotor;

(d) means for communicating the solid waste and carrier fluid from the rotor with the jet pump as an aspirated stream of the jet pump;

(e) secondary concentration means downstream of the jet pump receiving the discharge therefrom and for forming a concentrated stream of solid waste and a second cleansed stream; and (f) means for introducing the second cleansed stream back into the pitot separator as a feed stream thereto.

12. The improvement claimed in claim 11 wherein the secondary concentration means includes at least one cyclone separator.

13. The improvement claimed in claim 12 wherein the secondary concentration means includes at least two cyclone separators plumbed in parallel.

14. The improvement claimed in claim 11 wherein the solid waste and carrier liquid discharge means includes nozzles at the radial periphery of the rotor and into a space within casing for the rotor of the centrifugal separator, the solid waste communicating means communicating with this space.

15. The improvement claimed in claim 14 wherein the secondary concentration means includes at least two cyclone separators plumbed in parallel.

* * * * *